United States Patent
Fischer

(10) Patent No.: US 8,386,715 B2
(45) Date of Patent: Feb. 26, 2013

(54) METHOD AND APPARATUS FOR TILE MAPPING TECHNIQUES

(75) Inventor: Thomas Fischer, Berlin (DE)

(73) Assignee: Nokia Corporation, Espoo (FI)

( * ) Notice: Subject to any disclaimer, the term of this patent is extended or adjusted under 35 U.S.C. 154(b) by 431 days.

(21) Appl. No.: 12/627,556

(22) Filed: Nov. 30, 2009

(65) Prior Publication Data

US 2011/0131376 A1 Jun. 2, 2011

(51) Int. Cl.
*G06F 12/00* (2006.01)
(52) U.S. Cl. ................................ 711/122; 711/202
(58) Field of Classification Search ................. None
See application file for complete search history.

(56) References Cited

U.S. PATENT DOCUMENTS

| | | | |
|---|---|---|---|
| 6,148,377 A * | 11/2000 | Carter et al. ............... | 711/147 |
| 6,192,393 B1 | 2/2001 | Tarantino et al. | |
| 6,532,492 B1 | 3/2003 | Presler-Marshall | |
| 6,636,227 B1 | 10/2003 | Rivard et al. | |
| 6,760,024 B1 | 7/2004 | Lokovic et al. | |
| 7,315,259 B2 | 1/2008 | Sacks | |
| 7,599,790 B2 | 10/2009 | Rasmussen et al. | |
| 2004/0217980 A1 | 11/2004 | Radburn et al. | |
| 2005/0258256 A1 | 11/2005 | Jones et al. | |
| 2007/0013708 A1 | 1/2007 | Barcklay et al. | |
| 2007/0229524 A1 | 10/2007 | Hendrey et al. | |
| 2007/0252834 A1 | 11/2007 | Fay | |
| 2008/0178125 A1 | 7/2008 | Elsbree et al. | |
| 2008/0288248 A1 | 11/2008 | Monkowski | |
| 2008/0320413 A1 | 12/2008 | Oshiro et al. | |
| 2009/0037441 A1 | 2/2009 | Howell et al. | |
| 2009/0295816 A1 | 12/2009 | Kallio | |
| 2010/0047744 A1 | 2/2010 | Miura | |
| 2010/0077056 A1 | 3/2010 | Kokal et al. | |
| 2010/0115462 A1 | 5/2010 | Spencer et al. | |
| 2010/0198684 A1 | 8/2010 | Eraker et al. | |

OTHER PUBLICATIONS

Office Action for related U.S. Appl. No. 12/711,990, dated Aug. 28, 2012, pp. 1-38.

* cited by examiner

*Primary Examiner* — Shawn X Gu
(74) *Attorney, Agent, or Firm* — Ditthavong Mori & Steiner, P.C.

(57) ABSTRACT

A tile-map caching technique in which it is determined whether a tile object is stored in a first cache that is configured to store a plurality of tile objects associated with a map. It is also determined whether a resource locator associated with the tile object is stored in a second cache, if the tile object is not in the first cache. The tile object is retrieved based on the resource locator if the resource locator is stored in the second cache.

17 Claims, 10 Drawing Sheets

METHOD AND APPARATUS FOR TILE MAPPING TECHNIQUES

BACKGROUND

Service providers (e.g., wireless, cellular, etc.) and device manufacturers are continually challenged to deliver value and convenience to consumers by, for example, providing compelling network services. One area of interest has been the development of services and technologies for presenting mapping services. Often, these mapping services are provided using a server-client model to remotely offer the mapping services. However, retrieving map content from a remote provider entails incurring resource costs and introducing access latency. Accordingly, service providers and device manufacturers are challenged to develop new mechanisms for quickly and efficiently providing the map content.

SOME EXAMPLE EMBODIMENTS

Therefore, there is a need for an approach for improving tile-map caching techniques.

According to one embodiment, a method comprises determining whether a tile object is stored in a first cache that is configured to store a plurality of tile objects associated with a map. The method also comprises determining whether a resource locator associated with the tile object is stored in a second cache, if the tile object is not in the first cache. The method further comprises retrieving the tile object based on the resource locator if the resource locator is stored in the second cache.

According to another embodiment, an apparatus comprising at least one processor, and at least one memory including computer program code, the at least one memory and the computer program code configured to, with the at least one processor, cause, at least in part, the apparatus to determine whether a tile object is stored in a first cache that is configured to store a plurality of tile objects associated with a map. The apparatus is also caused to determine whether a resource locator associated with the tile object is stored in a second cache, if the tile object is not in the first cache. The apparatus is further caused to retrieve the tile object based on the resource locator if the resource locator is stored in the second cache.

According to another embodiment, a computer-readable storage medium carrying one or more sequences of one or more instructions which, when executed by one or more processors, cause, at least in part, an apparatus to determine whether a tile object is stored in a first cache that is configured to store a plurality of tile objects associated with a map. The apparatus is also caused to determine whether a resource locator associated with the tile object is stored in a second cache, if the tile object is not in the first cache. The apparatus is further caused to retrieve the tile object based on the resource locator if the resource locator is stored in the second cache.

According to another embodiment, an apparatus comprises means for determining whether a tile object is stored in a first cache that is configured to store a plurality of tile objects associated with a map. The apparatus also comprises means for determining whether a resource locator associated with the tile object is stored in a second cache, if the tile object is not in the first cache. The apparatus further comprises means for retrieving the tile object based on the resource locator if the resource locator is stored in the second cache.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing tile mapping techniques are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
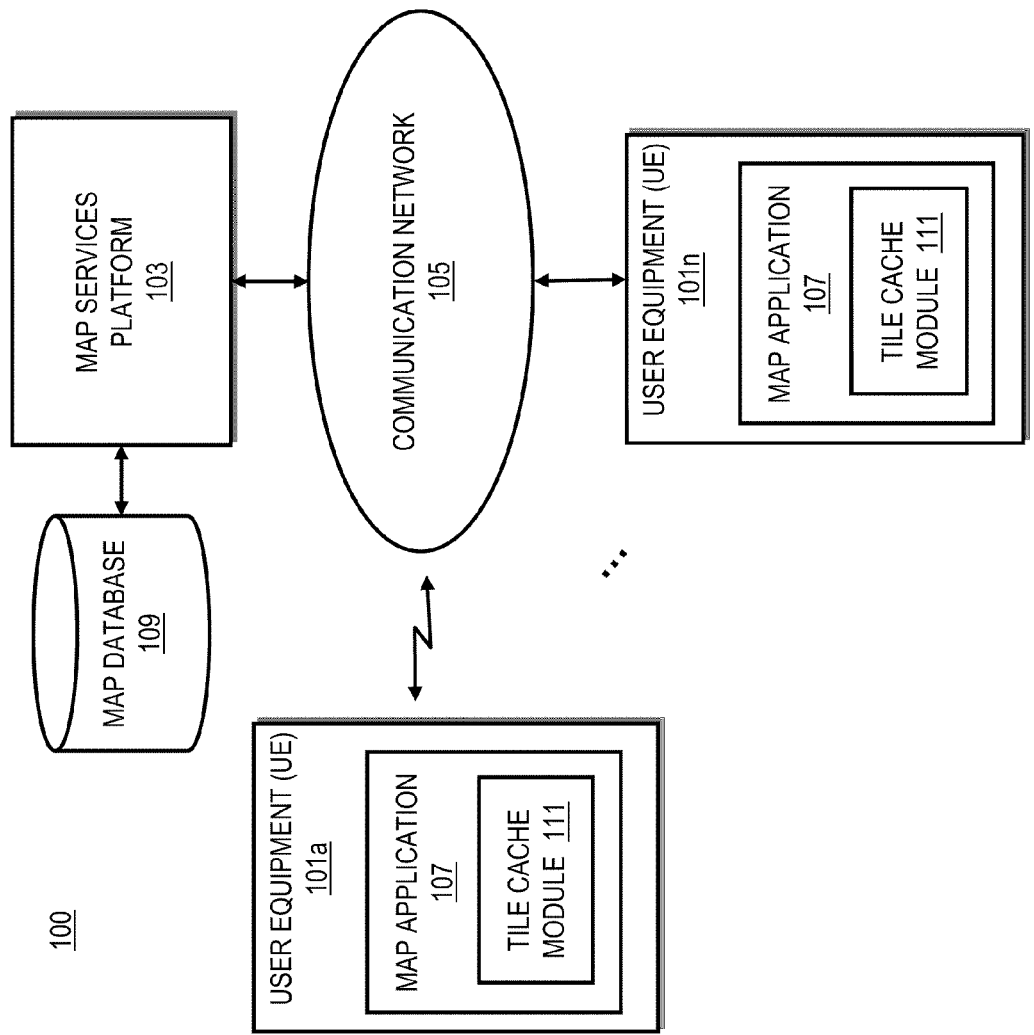
FIG. 1 is a diagram of a system including user equipment capable of caching map tiles using tile mapping techniques, according to one embodiment.

FIG. 1 is a diagram of a system including user equipment capable of caching map tiles using tile mapping techniques, according to one embodiment. As discussed previously, it is becoming increasingly common for service providers to offer map services. Mapping services may include any service that provides one or more map images or objects for display to users. As such, mapping services may additionally include navigation services (e.g., routing services) and/or location services (e.g., point of interest finding services). These services may be provided to a user equipment from a remote map services platform. Moreover, the map services may be offered via the internet to the user equipment and the user equipment may utilize a web browser or other application to receive the map services. The map images and objects provided may be panned and zoomed to show different views of map content. Traditionally, web browsers and applications receiving the map images or objects from a remote map services platform retrieve map images and objects each time the map is panned, zoomed, or otherwise modified. However, retrieving the map images and objects adds to the latency of receiving the map service executing on the map application or web browser.

Caches, in general, are utilized to reduce the latency of receiving the map service. However, caches may utilize a large memory footprint on user equipment to provide these services. The size of a cache may be problematic for user equipment with limited memory resources.

To address this problem, a system 100 of FIG. 1 introduces the capability to cache map tiles more effectively. As used herein, map tiles may refer to images corresponding to portions of a map image. Map tiles may be combined to form a complete map image. Map tiles can be transported to a user equipment (UE) 101 using tile objects, which may be data objects that may include one or more map tile. Further, a tile object may include one or more identifiers. In certain embodiments, a tile object includes an identifier to identify a unique map tile, a map type (e.g., terrain, satellite, topographical, etc.), a zoom level, location coordinates, a map image or a combination thereof. In other embodiments, the tile object may include a single identifier (e.g., a uniform resource identifier (URI)) and may include an image object. Tile objects can be received from a map services platform 103 via a communication network 105. A map application 107, which may include a web browser, on the UE 101 may be used to retrieve and display map tiles retrieved from a map database 109 of the map services platform 103. The map application 107 may have associated with it a tile cache module 111 to store tile objects or information about the tile objects, such as a map tile image resource or a resource locator or other identifier of the tile object. The map tile image resource may include a bitmap image used to display a map tile. In certain embodiments, the map application 107 may be software (e.g., a widget, a gadget, or the like) based on standard web technologies (e.g., web runtime (WRT)—a web application runtime environment included in many browsers) that serve as frontends or clients to web-based or other content. The map application 107 may be associated with a browser to provide the map content.

In certain embodiments, the tile cache module 111 may include a first level cache that stores the tile object and a second level cache that includes a resource locator cache. The resource locator cache may include uniform resource locators (URLs) that may be used to identify and locate tile objects from the map services platform 103. Further, the resource locator may be used to retrieve tile objects from a third web browser cache. In certain embodiments, the first and second level caches may be stored in a memory of the UE 101 and associated with the map application 107. For example, the first and second level caches may be part of a software module (e.g., a plugin, the runtime module of the map application 107, etc.) used for tile mapping techniques. Moreover, the web browser cache may be stored in the same memory or another memory associated with the web browser, which may be used to execute or otherwise be associated with the map application 107. In certain embodiments, the first and second level caches may be part of a volatile memory (e.g., random access memory) and the browser cache may be part of a non-volatile memory (e.g., flash memory or a hard drive memory). As noted above, tiles can be portions of the image of a map that may be combined to put together a map image.

In certain embodiments, the map application 107 may request and receive tile objects of specified content from the map services platform 103. When the tile objects are received, the map application 107 can store the tile objects and information about the tile objects in the tile cache module 111 using the techniques detailed above. Further, when requesting tile objects from the map services platform 103, the map application 107 may utilize the tile cache module 111 to retrieve the tile objects in conjunction with or in place of requesting the tile objects from the map services platform 103.

Under one scenario, the map application 107 requests the tile objects based on a quick map redraw. A quick map redraw may include drawing a map image utilizing tile objects and the tile cache module 111. The quick map redraw may be in response to a change in zoom level or based on a panning of the map. Further, in certain embodiments, the tile objects may be retrieved utilizing the tile cache module 111 only if the map application 107 can retrieve the tile object from a local memory of the UE 101. The quick map redraw may retrieve and display tile objects from a presentation layer, which may also be considered a top map layer, associated with a map image of a zoom level to be presented. If any or all of the tiles are not found using the tile cache module 111, tile objects associated with the next closest zoom level are utilized. The purpose for this may be to display alternative map tiles for the missing map tiles to make the presentation look complete. The next closest zoom level may be the next zoom level zoomed out or zoomed in from the presentation zoom level. Each next zoom level is utilized until either each map tile to be presented or there are no more zoom levels is as detailed in the description of FIGS. 6A and 6B.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, navigation device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may include a user interface can include various methods of communication. For example, the user interface can have outputs including a visual component (e.g., a screen), an audio component, a physical component (e.g., vibrations), and other methods of communication. User inputs can include a touch-screen interface, a scroll-and-click interface, a button interface, a microphone, etc.

By way of example, the UE 101 and map services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the map application 107 and the map services platform 103 interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
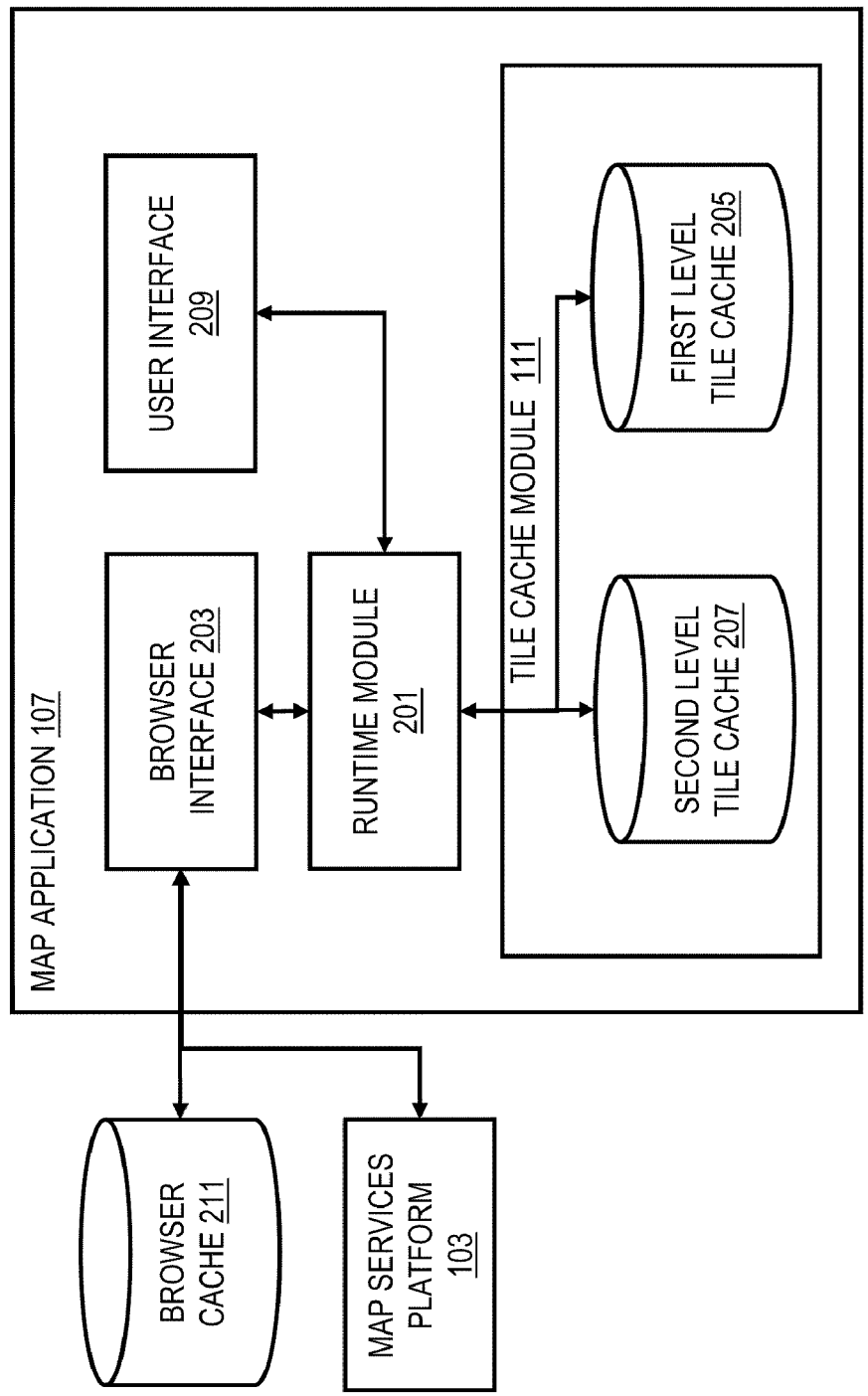
FIG. 2 is a diagram of the components of a map application, according to one embodiment.

FIG. 2 is a diagram of the components of a map application, according to one embodiment. By way of example, the map application 107 includes one or more components for providing tile mapping techniques. It is contemplated that the functions of these components may be combined in one or more components or performed by other components of equivalent functionality. In this embodiment, the map application 107 includes a runtime module 201 executing the map application 107, a browser interface 203 to communicate with a browser (e.g., a web runtime) associated with the map application 107, a first level tile cache 205 storing tile objects, a second level tile cache 207 storing URL information associated with the tile objects, and a user interface 209 to display tile objects and receive input.

The map application 107 may execute on the runtime module 201. In some embodiments, the runtime module 201 may execute upon a web runtime. Moreover, in certain embodiments, the map application 107 may be in the form of a web browser executing a web page. The tile cache module 111 may be implemented in the form of a plugin to the browser (e.g., utilizing JavaScript code). In this manner, the plugin may be utilized by a web browser or web runtime for caching of the map application 107. A browser interface 203 may be used to interface the map application 107 with the UE 101. Moreover, the user interface 209 may be utilized to interact with a user of the UE 101.

The user may input requests to view maps. Examples of inputs may include entering text or using a point and click mechanism (e.g., a mouse or touch screen device). The input can cause the map application 107 to fetch a map to display on the user interface 209. The map tile image resource may be fetched from the map services platform 103 using the browser interface 203. The map tile image resource may be included in a tile object (e.g., in the tile objects associated with the first level tile cache 205). The browser can store copies of the tile objects in a browser cache 211. The browser cache 211 can include information that is normally retrieved by a web browser such as web pages, images, documents, etc. and can include tile objects. Moreover, when a tile object is retrieved, a resource locator associated with the tile object is stored in the second level tile cache 207. As previously mentioned, a tile object stored in the second level tile cache 207 may include an identifier to identify a unique map tile, a map type, a zoom level, location coordinates or a combination thereof. Because the second level tile cache 207 may be utilized to keep a memory footprint associated with the cache small, the second level tile cache 207 need not include an image of the map tile. Additionally, a copy of the tile object may be stored in the first level tile cache 205 with an image of the map tile. In certain embodiments, the tile object is stored in the first level tile cache 205 or the second level tile cache 207, but not both. In these embodiments, the tile object stored in the first level tile cache 205 includes a map tile image object while the tile object stored in the second level tile cache 207 does not include a map tile image object. Additionally, in these embodiments, when a tile object is removed from the first level tile cache 205, the tile object is placed in the second level tile cache 207. Moreover, in these embodiments, when a tile object is utilized from the second level tile cache 207, it is removed from the second level tile cache 207 and stored in the first level tile cache 207 with the addition of the map tile image object. The sizes of the caches may be predetermined or variable and common replacement techniques (e.g., least recently used, adaptive replacement cache, least frequently used, etc.) may be utilized for each level of caching. Once a tile object is stored in the caches, further uses of the tile object can be called using one or more of the caches as described in FIGS. 3-5.

Figure 3:
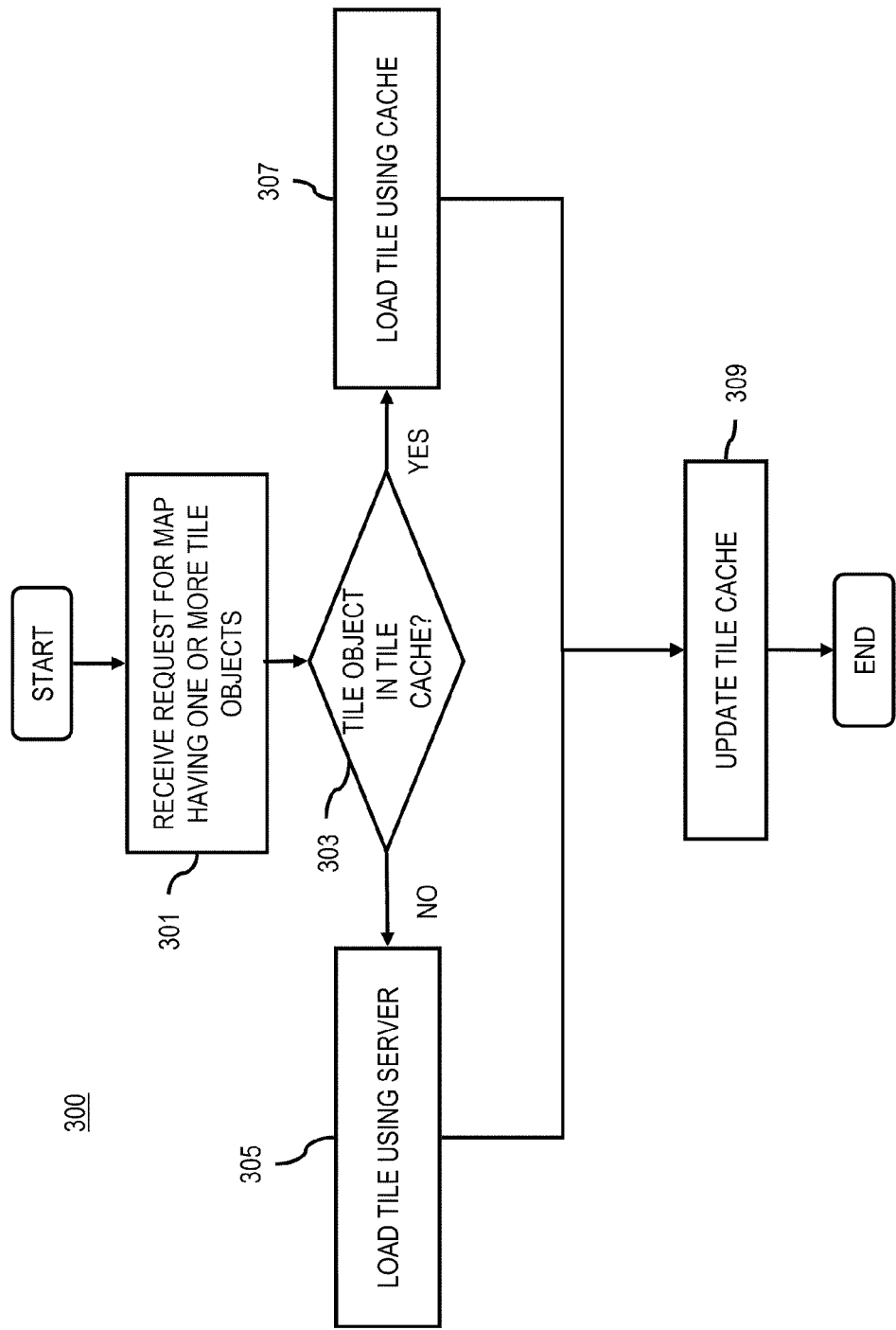
FIGS. 3-5 are flowcharts of processes for utilizing a tile mapping cache, according to various embodiments.

FIG. 3 is a flowchart of a process for utilizing a tile mapping cache, according to various embodiments. In one embodiment, the map application 107 performs the process 300 and is implemented in, for instance, a chip set including a processor and a memory as shown FIG. 8. A user of the UE 101 may initiate the map application 107. The user of the UE 101 may utilize the map application 107 to display a map. The map may comprise one or more tile objects.

In step 301, the map application 107 receives a request for the map, including one or more tile objects, each corresponding to a portion of the map. The map application 107 may determine that a particular map tile image resource is needed to complete the display of the map. Once this determination is made, the map application 107 determines if the tile object is within the tile cache (step 303). First, the map application 107 determines if the tile object is within the first level first level tile cache 205. If the tile object is not within the first level tile cache 205, the map application 107 determines if tile object information (e.g., a resource locator) about the tile object is stored within the second level second level tile cache 207. If information about the tile object is found in neither cache, at step 305, the map application 107 retrieves the tile object from the map services platform 103.

Otherwise, if the tile object information is determined to be included in the first level tile cache 205 or in the second level tile cache 207, the tile object is loaded using the tile cache (step 307). If the tile object is determined to be stored in the first level tile cache 205, the tile object is retrieved from the first level tile cache 205 for use in displaying the map. Moreover, if the tile object is determined to be associated with one of the resource locators in the second level tile cache 207, the map application 107 presumes that information (e.g., the tile object) the particular resource locator is directed towards is stored within a browser cache 211 associated with the map application 107. If so, the tile object is retrieved from the browser cache 211. If not, the tile object is requested from the map services platform 103 based on the resource locator. The retrieval processes of the tile caches are further detailed in the discussions of FIGS. 4 and 5. Once the tile object is retrieved, the tile cache is updated (step 309) with the tile object.

Figure 4:
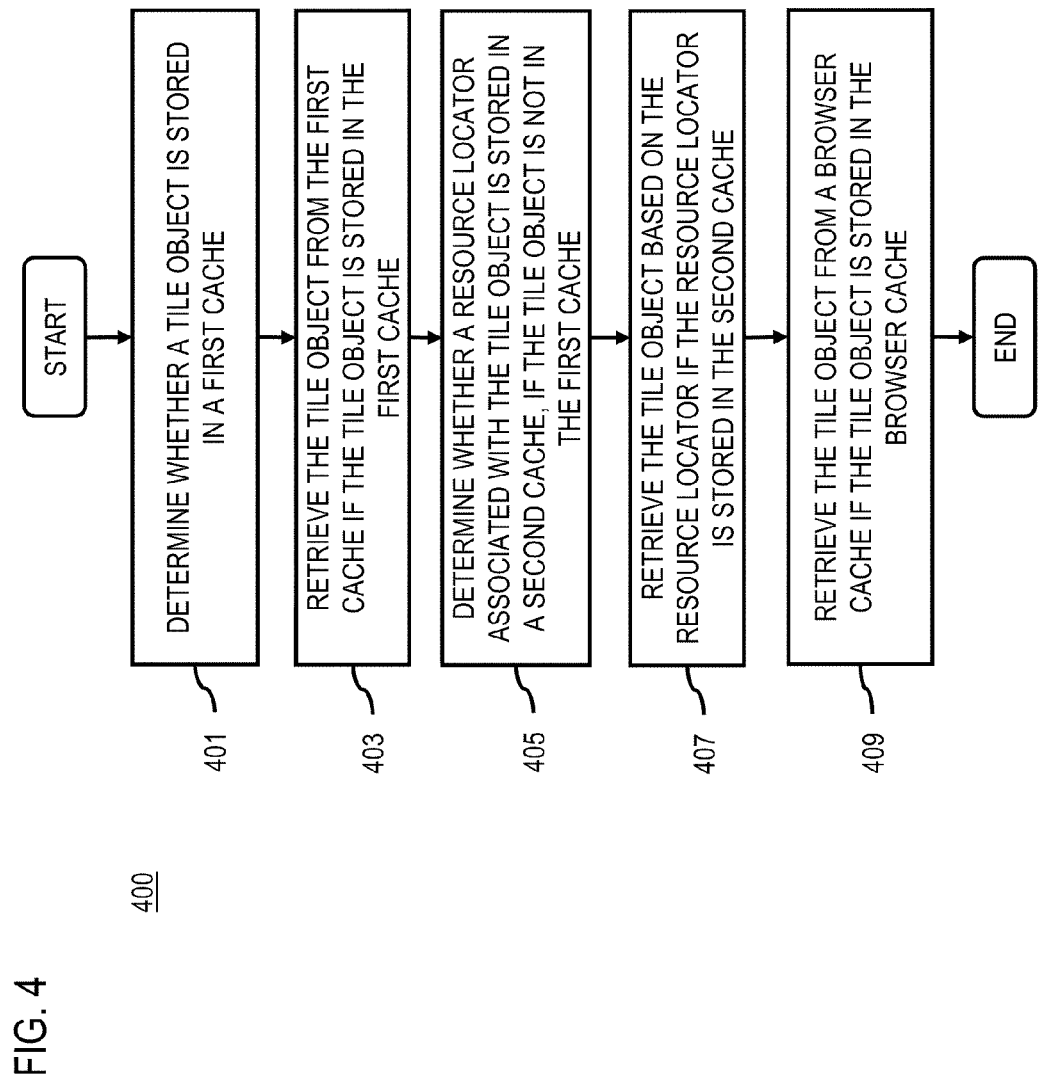

FIG. 4 is a flowchart of processes for utilizing a tile mapping cache, according to one embodiment. In one embodiment, the map application 107 performs the process 400 and is implemented in, for instance, a chip set including a processor and a memory as shown FIG. 8. The process can occur when the map application 107 attempts to retrieve a tile object to display the map. In step 401, the map application 107 determines whether the tile object is stored in a first cache (e.g., the first level tile cache 205) that is configured to store a plurality of tile objects associated with the map. The determination may be made using common caching techniques.

If the tile object is determined to be stored in the first level tile cache 205, the tile object is retrieved from the first level tile cache 205 (step 403). The tile object may include a map tile image resource, additional information identifying the tile object, or other like data. Moreover, the first level tile cache 205 may include a timestamp associated with the latest use of the tile object. In one approach, the least recently used tile object may be replaced by a new tile object based on the time stamp information. As an alternative to utilizing a timestamp, the cache may store the tile objects in an ordered least recently used list and reorder the list then a tile object is updated. In this manner, a tile object already stored in the list is removed from the list and added to the start of the list. If the tile object is has not been previously stored in the list, the tile object may be added to the start of the list and if there is insufficient space, a tile object at the end of the list is removed. In certain embodiments, updates to a timestamp may be correlated to updating the list in this manner. Alternatively or additionally, other caching algorithms may be used with corresponding information utilized by the first level tile cache 205. Once the tile object is retrieved, the timestamp associated with the tile object is updated with current timing information.

If the tile object is not stored in the first level tile cache 205, then it is determined whether a resource locator associated with the tile object is stored in a second cache (e.g., a second level tile cache 207) (step 405). The determination may be made based on the comparison of a URL of the tile object and a resource locator stored in the second level tile cache 207.

Also, because the resource locator generally requires less storage space than a tile object (which may include a tile image), more tile resource locators may be stored than tile objects. Further, this may reduce the size of the two level cache because the second level of cache needs less data per resource locator stored than the first level tile cache 205.

Next, at step 407, the tile object is retrieved based on the resource locator if the resource locator is stored in the second level tile cache 207. As noted previously, the browser cache 211 may include tile objects, web pages, other images, etc. Each of the objects stored in the browser cache 211 may include resource locator information (e.g., a URL or other identifier). As previously noted, in one embodiment, it is assumed that if the resource locator is located in the second cache, the tile object is stored in the browser cache 211. The map application 107 attempts to request and retrieve the tile object from the browser cache 211 (step 409). If the tile object is not found within the browser cache 211, the tile object is requested from the map services platform 103. The map application 107 then instantiates a tile object to add to the first level tile cache 205 when the tile object is loaded. The tile object can be stored in the first level tile cache 205. The timestamps associated with the tile object and the tile resource locator in the caches may additionally be updated.

With the above approach, the efficiency of retrieving maps is improved. The use of the first level cache and the second level cache may improve the memory footprint of the caches because the second level resource locator cache needs less memory than storing the entire tile object. Further, the second level resource locator cache is able to predict whether a map tile is likely stored in the browser cache 211, which may be utilized to retrieve the entire tile object instead of the map services platform 103.

Figure 5:
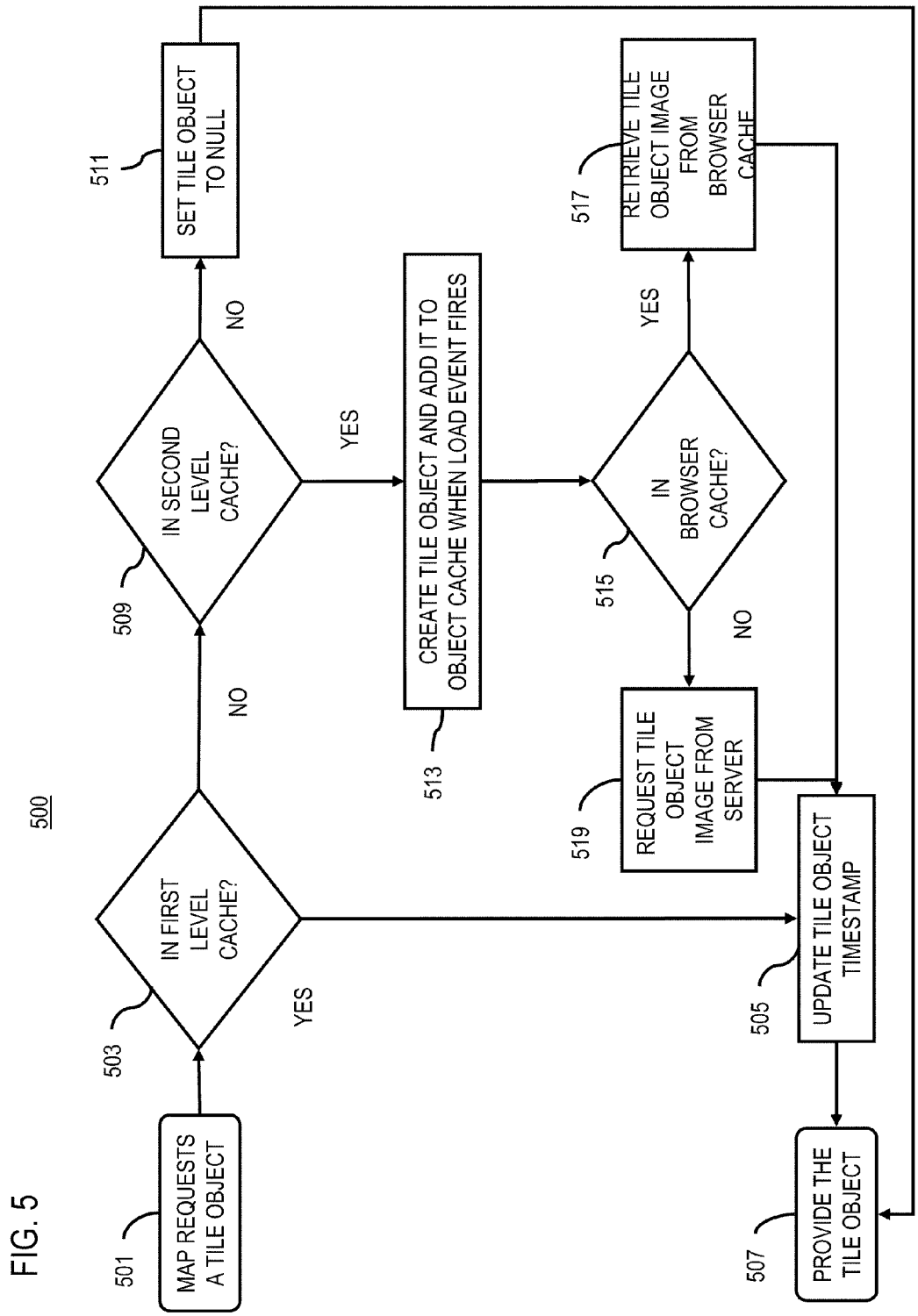

FIG. 5 is a flowchart of processes for utilizing a tile mapping cache, according to one embodiment. In one embodiment, the runtime module 201 performs the process 500 and is implemented in, for instance, a chip set including a processor and a memory as shown FIG. 8. The following processes may be a part of a tile cache module 111 executing within the map application 107. In step 501, the runtime module 201 determines that a map needs a particular tile object to display. The runtime module 201 then determines if the tile object is stored within the first level tile cache 205 (step 503) as detailed in the processes of FIG. 4. If the tile object is stored within the first level tile cache 205, the timestamp of the tile object is updated (step 505) and the tile object is provided for use by the map application 107 (step 507).

If the tile object is not stored within the first level tile cache 205, the runtime module 201 determines if a resource locator with information about the tile object is stored in the second level tile cache 207 (step 509) as detailed in the processes of FIG. 4. If the resource locator is not stored within the second level tile cache 207, the tile object is set to null (step 511) and provided to the map application 107 (step 507). The map application 107 may be configured to determine that the null setting corresponds to the tile object not being able to be retrieved by the tile cache module 111. The map application 107 may then retrieve the tile object from the map services platform 103 and update the first level tile cache 205 and the second level tile cache 207 based on the retrieval. If the resource locator is stored within the second level tile cache 207, the runtime module 201 creates a new tile object to add to the first level tile cache 205 when the tile object is loaded (step 513) as detailed in the processes of FIG. 4. Further, the resource locator's timestamp may be updated to show its recent use.

Then, at step 515, the runtime module 201 queries a browser cache 211 for the tile object (or an image associated with the tile object) stored in the browser cache 211 based on the resource locator. The tile cache module 111 presumes that the tile object is stored in the browser cache 211 if the tile object information is stored in the second level tile cache 207. This presumption may be based on building the structure of the second level tile cache 207 using caching algorithms associated with the browser cache 211. If the tile object is stored in the browser cache 211, the runtime module 201 receives the tile object and/or map tile image resource from the browser cache 211 (step 517). Otherwise, the browser cache 211 notifies the runtime module 201 that the tile object is not in the browser cache 211 and the tile object and/or tile object image are requested and received from the map services platform 103 (step 519). Then, the new tile object is loaded with the resource locator information, tile object stored in the browser cache 211, the tile object image, and/or a combination thereof or additional information. The new tile object is then stored in the first level tile cache 205 utilizing a tile caching algorithm and its timestamp is updated.

Figure 6A:
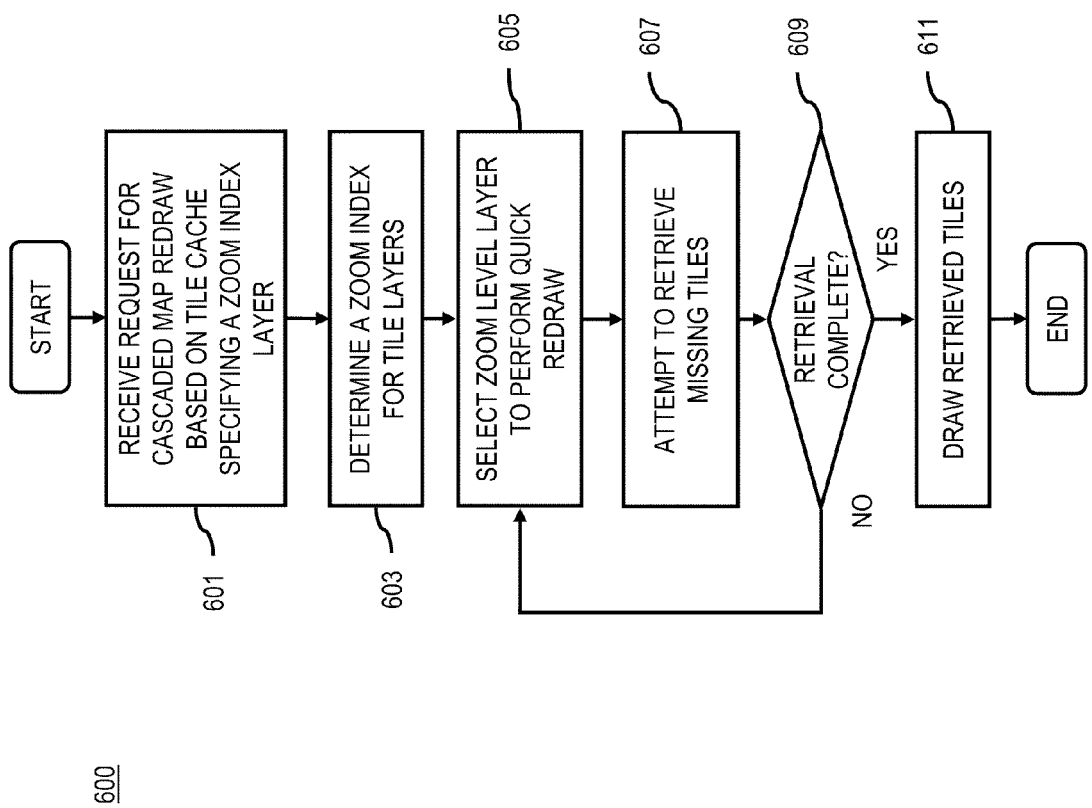
FIG. 6A is a flowchart of a process for drawing a cascaded map using a mapping cache, according to one embodiment.

FIG. 6A is a flowchart of a process for drawing a cascaded map using a mapping cache, according to one embodiment. In one embodiment, the map application 107 performs the process 600 and is implemented in, for instance, a chip set including a processor and a memory as shown FIG. 8. In step 601, the map application 107 receives a request for a cascaded map redraw based on the tile cache module 111. The request specifies a zoom layer, where each tile map may include one tile layer for each zoom layer. In certain embodiments, a cascaded map redraw is a redraw of a map utilizing tile maps when the map position and/or zoom level has been changed. The specified zoom layer can be considered a top layer, which represents the layer to be displayed. A first level of redraw is a quick redraw that is based on the tile cache module 111. A purpose for the redraw is to quickly display tile objects associated with the new location or zoom level while waiting for additional tile objects to be retrieved from a map services platform 103. In certain embodiments, if not all tiles for the actual zoom level to be displayed are stored within the cache, the map application 107 will attempt to try to display cached tiles of the closest zoom layer to the current layer. The closest zoom layer may be selected by alternating between up-scaled zoom layers and downscaled zoom layers. This retrieval process may be repeated until a zoom layer can cover the requested map area or if the difference between the actual zoom layer and closest zoom layer is too large (e.g., based on predetermined zoom layer criteria). Presenting map zoom layers with too great a difference may be less useful to the user because the zoom layer may not be contextually relevant to the user. In this manner, if the actual tile object to be displayed is not stored within the cache, the map application 107 selects a next closest tile object for presentation during the quick redraw. A second level of the redraw is a delayed redraw that loads the full tile map based on both the tile cache module 111 and the map services platform 103.

At step 603, the map application 107 determines a zoom index for the tile layers. The zoom index may associate zoom layers corresponding to the closest zoom layers to the specified zoom index layer. For example, if there are 12 zoom level layers (e.g., zoom level layers 1-12) and the specified zoom index layer was zoom level layer 4, the closest zoom layers may be, in order, zoom level layers 5, 3, 6, 2, 7, 1, 8, 9, 10, 11, and 12. Alternative zoom level layers may be considered closest as well, for example the closest zoom level layers may be considered to be 3, 5, 2, 6, 1, 7, 8, 9, 10, 11, and 12. Under the first scenario, the zoom level layers under zoom level 4 are zoomed in from level 4 and the zoom level layers above level 4 are zoomed out from level 4. In this example, the zoom level layers may be ordered so that the closest matching zoom level layers are the closest level layers. For each of the layers, there may be a certain number of tiles that are stored in the tile cache module 111.

Figure 6B:
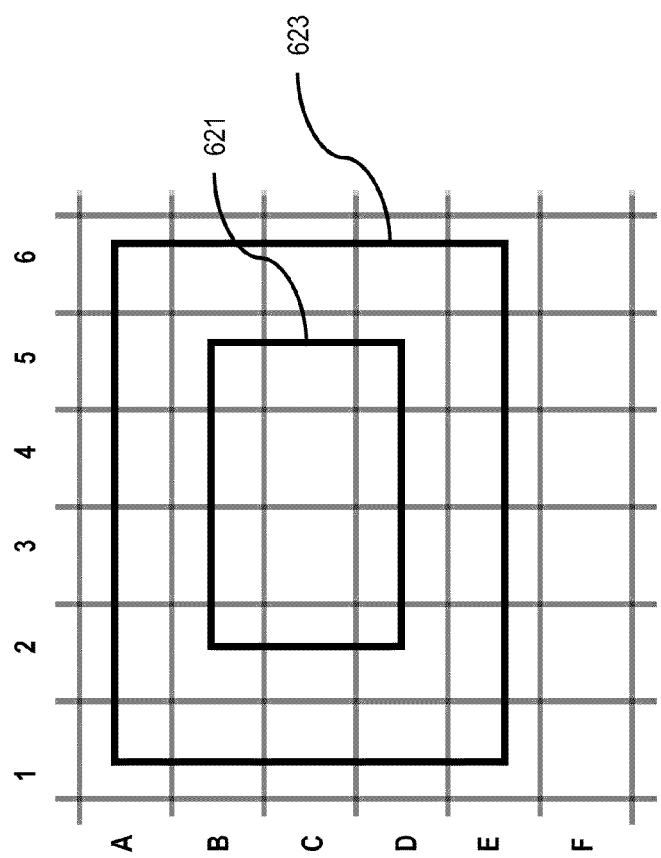
FIG. 6B is a diagram of tiles that may be associated with a tile map, according to one embodiment.

FIG. 6B is a diagram of tiles that may be associated with a tile map 620 for a single tile layer, according to one embodiment. Each block (e.g., block A1) may represent a tile object and/or a map tile. The tile object may include a map image corresponding to block A1 that represents the section of the map of the tile layer. In certain scenarios, a viewport 621 of a user interface 209 is used to display full or partial tiles. Each of these tiles may be stored in the tile cache module 111 when the tile layer is displayed. Thus, tiles B2 through B5, C2 through C5, and D2 through D5 may be stored in the tile cache module 111. Additionally, there may also be a padding area 623 that is pre-cached before the viewing port 621. Thus, tiles A1 through A6, B1, B6, C1, C6, D1, D6, E1 through E6 may be cached in the tile cache module 111. In certain embodiments, portions of one or more tile layers surrounding the tile layer may be pre-cached as well or cached because the user viewed the tile layer tile objects at one time. Further, the tile cache module 111 may store tile objects from these layers because the map application 107 has previously displayed that level.

The quick redraw may be executed by selecting the closest zoom level layer (step 605). The first selected zoom level layer is the top layer. At step 607, the tiles that should be provided on the view port 621 attempted to be retrieved from the tile cache module 111. In one embodiment, for the quick redraw, only tile objects stored in the tile cache are retrieved. The map application 107 then determines if the retrieval of missing tiles is complete (step 609). If the retrieval is not complete, the next closest zoom level layer is selected to perform the quick redraw (step 605). In the above example, where the specified zoom level layer is level 4, the next order of closest zoom level layers is 5, 3, 6, 2, 7, 1, 8, 9, 10, 11, and 12. For each zoom level layer from the closest zoom level layer to the least close zoom level layer, missing map tile image resources are retrieved from the tile cache module 111 (step 607). Retrieval is complete when enough tiles are retrieved to fill the view port 621 or if all zoom tile levels have been checked. Then, at step 611, the retrieved tiles are drawn to the view port 621. The retrieved tiles may be drawn and presented as each tile object is retrieved or when all of the tiles are retrieved.

Then, the full redraw is performed. The full redraw may be completed based on the cache or retrieved from a map services platform 103. The map application 107 only retrieves the top layer for the full redraw. Moreover, the full redraw may be delayed until after the quick redraw is completed, each time the zoom level changes or is panned, another quick redraw is initiated and the full redraw is delayed.

The processes described herein for providing tile-map caching techniques may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
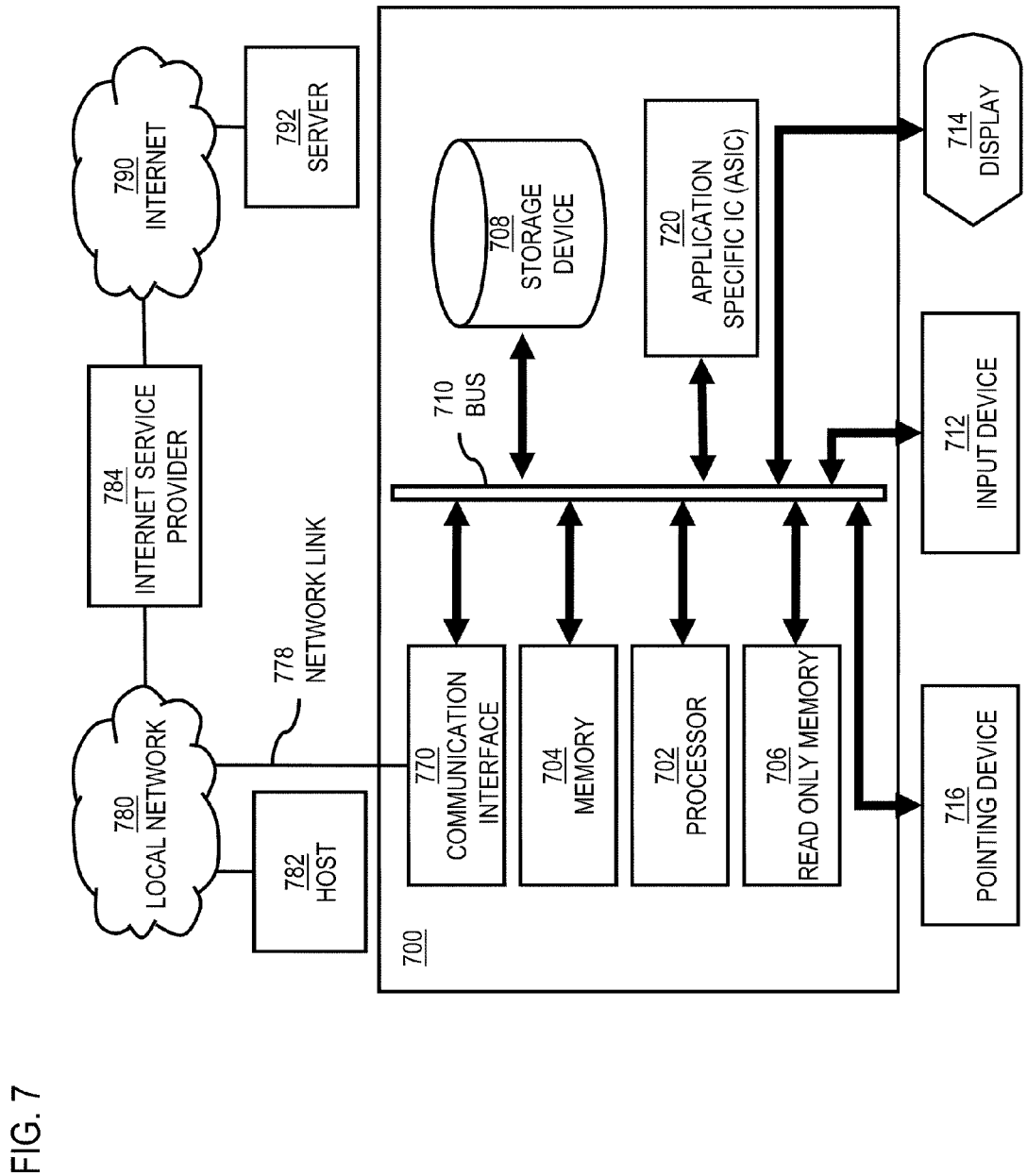
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG.

7 can deploy the illustrated hardware and components of system 700. Computer system 700 is programmed (e.g., via computer program code or instructions) to provide tile-map caching techniques as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing tile-map caching techniques.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to tile-map caching techniques. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing tile-map caching techniques. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for tile-map caching techniques, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing tile objects to the UE 101.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
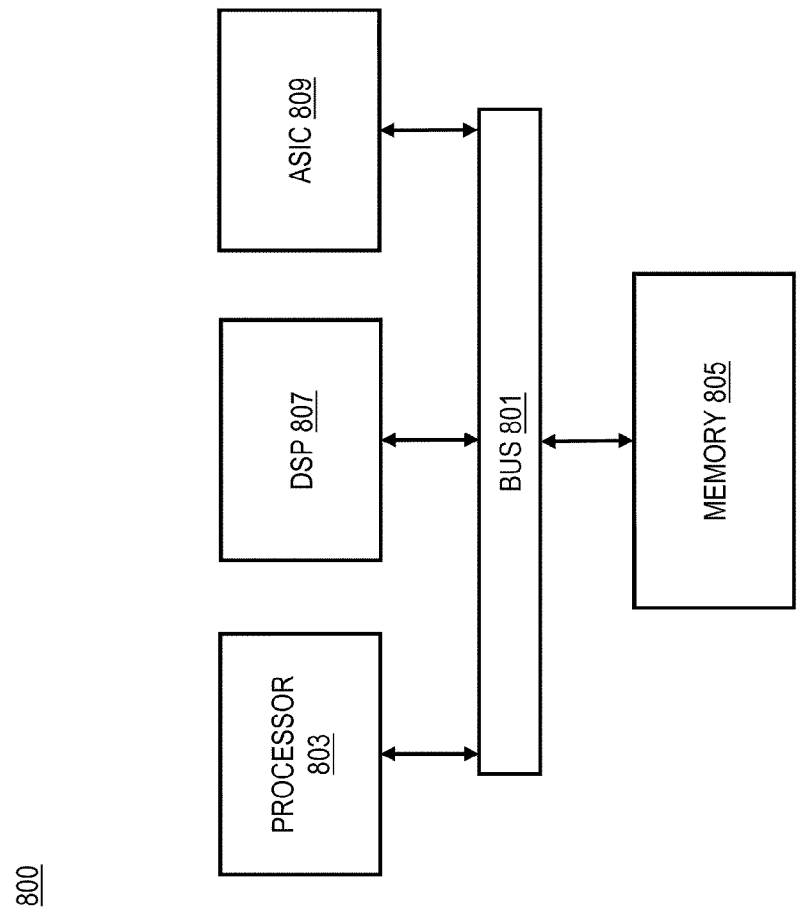
FIG. 8 is a diagram of a chip set that can be used to implement an embodiment of the invention.

FIG. 8 illustrates a chip set 800 upon which an embodiment of the invention may be implemented. Chip set 800 is programmed to provide tile-map caching techniques as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of providing tile-map caching techniques.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide tile-map caching techniques. The memory 805 also stores the data associated with or generated by the execution of the inventive steps.

Figure 9:
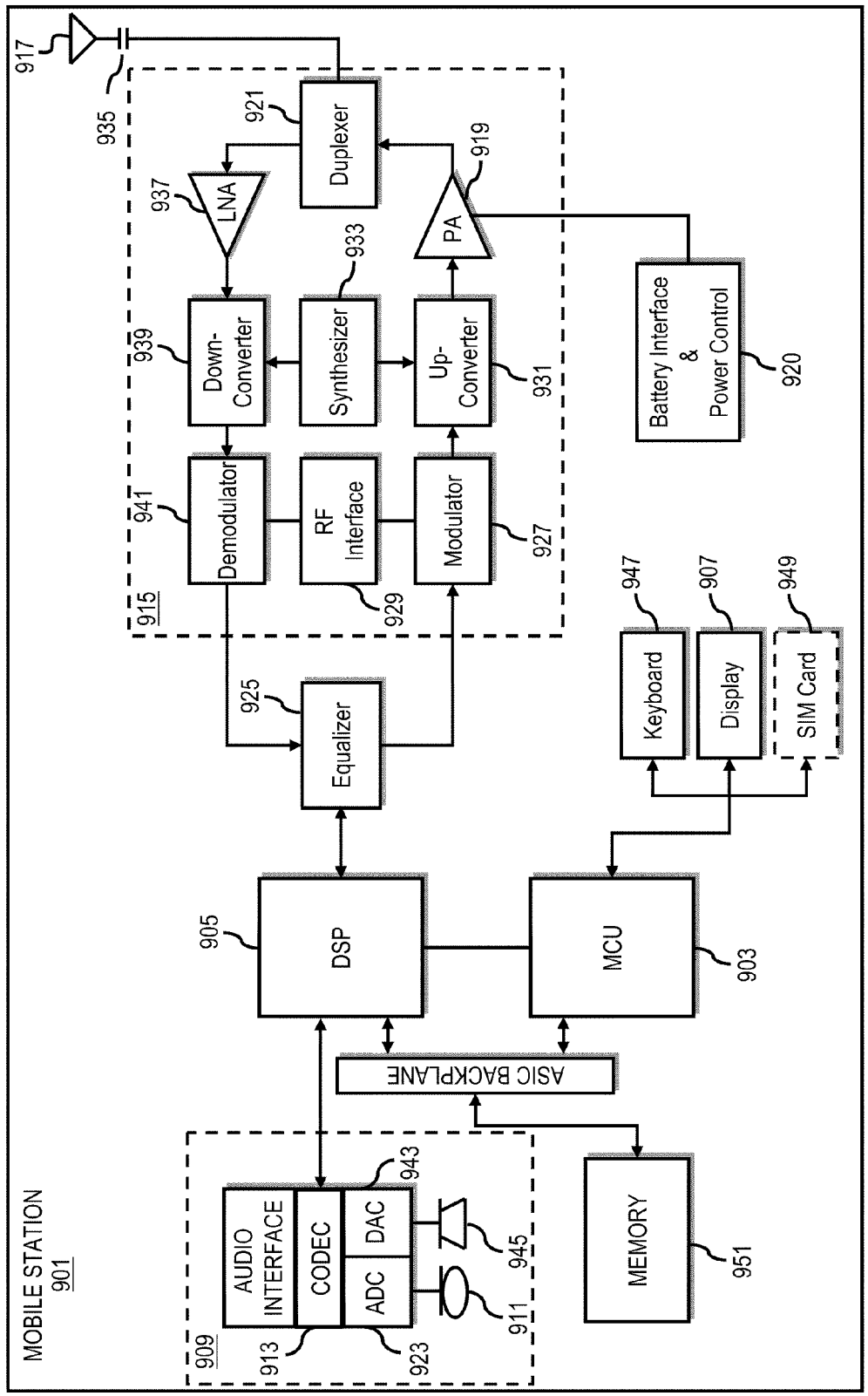
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing tile-map caching techniques. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing tile-map caching techniques. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide tile-map caching techniques. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining whether a tile object is stored in a first cache that is configured to store a plurality of tile objects associated with a map;
   determining whether a resource locator associated with the tile object is stored in a second cache, if the tile object is not in the first cache; and
   retrieving the tile object based on the resource locator if the resource locator is stored in the second cache,
   wherein the tile object includes a map image associated with a portion of the map, and
   wherein the map is a navigation and/or location map.

2. A method of claim 1, further comprising:
   retrieving the tile object from a browser cache if the tile object is stored in the browser cache.

3. A method of claim 1, further comprising:
   updating the first cache with the retrieved tile object.

4. A method of claim 3, further comprising:
   removing the tile object from the first cache; and
   updating the second cache with the resource locator of the tile object.

5. A method of claim 1, further comprising:
   receiving a request for the tile object for a cached map redraw; and
   causing, at least in part, the tile object to be presented in response to the request.

6. A method of claim 5, further comprising:
   receiving a request for another tile object for the cache map redraw based on a zoom level index;
   determining whether the other tile object is stored in the first cache;
   determining whether another resource locator associated with the other tile object is stored in the second cache, if the other tile object is not in the first cache; and
   retrieving the other tile object based on the other resource locator if the resource locator is stored in the second cache.

7. An apparatus comprising:
   at least one processor; and
   at least one memory including computer program code,
   the at least one memory and the computer program code configured to, with the at least one processor, cause the apparatus to perform at least the following,
      determine whether a tile object is stored in a first cache that is configured to store a plurality of tile objects associated with a map;
      determine whether a resource locator associated with the tile object is stored in a second cache, if the tile object is not in the first cache; and
      retrieve the tile object based on the resource locator if the resource locator is stored in the second cache,
      wherein the tile object includes a map image associated with a portion of the map, and
      wherein the map is a navigation and/or location map.

8. An apparatus of claim 7, wherein the apparatus is further caused, at least in part, to:
   retrieve the tile object from a browser cache if the tile object is stored in the browser cache.

9. An apparatus of claim 7, wherein the apparatus is further caused, at least in part, to:
   update the first cache with the retrieved tile object.

10. An apparatus of claim 7, wherein the apparatus is further caused, at least in part, to:
    remove the retrieved tile object from the first cache; and
    update the second cache with the resource locator of the tile object.

11. An apparatus of claim 7, wherein the apparatus is further caused, at least in part, to:
    receive a request for the tile object for a cached map redraw; and
    cause, at least in part, the tile object to be presented in response to the request.

12. An apparatus of claim 11, wherein the apparatus is further caused, at least in part, to:
    receive a request for another tile object for the cache map redraw based on a zoom level index;
    determine whether the other tile object is stored in the first cache;
    determine whether another resource locator associated with the other tile object is stored in the second cache, if the other tile object is not in the first cache; and retrieve the other tile object based on the other resource locator if the resource locator is stored in the second cache.

13. A non-transitory computer-readable storage medium carrying one or more sequences of one or more instructions which, when executed by one or more processors, cause an apparatus to at least perform the following steps:
   determining whether a tile object is stored in a first cache that is configured to store a plurality of tile objects associated with a map;
   determining whether a resource locator associated with the tile object is stored in a second cache, if the tile object is not in the first cache; and
   retrieving the tile object based on the resource locator if the resource locator is stored in the second cache,
   wherein the tile object includes a map image associated with a portion of the map, and
   wherein the map is a navigation and/or location map.

14. A non-transitory computer-readable storage medium of claim 13, wherein the apparatus is caused, at least in part, to further perform:
   retrieving the tile object from a browser cache if the tile object is stored in the browser cache.

15. A non-transitory computer-readable storage medium of claim 13, wherein the apparatus is caused, at least in part, to further perform:
   updating the first cache with the retrieved tile object.

16. A non-transitory computer-readable storage medium of claim 13, wherein the apparatus is caused, at least in part, to further perform:
   receiving a request for the tile object for a cached map redraw; and
   causing, at least in part, the tile object to be presented in response to the request.

17. A non-transitory computer-readable storage medium of claim 16, wherein the apparatus is caused, at least in part, to further perform:
   receiving a request for another tile object for the cache map redraw based on a zoom level index;
   determining whether the other tile object is stored in the first cache;
   determining whether another resource locator associated with the other tile object is stored in the second cache, if the other tile object is not in the first cache; and
   retrieving the other tile object based on the other resource locator if the resource locator is stored in the second cache.

* * * * *